US012675735B2

(12) United States Patent
Li et al.

(10) Patent No.: US 12,675,735 B2
(45) Date of Patent: Jul. 7, 2026

(54) AUTOMATIC ALERT DISPOSITIONING USING ARTIFICIAL INTELLIGENCE

(71) Applicant: Bank of America Corporation, Charlotte, NC (US)

(72) Inventors: Yvonne Li, Jersey City, NJ (US); Franklin Kaiyuen Chan, Fort Lee, NJ (US); Min Kyung Kim, Jersey City, NJ (US); Jared Scott Ginsberg, New York, NY (US); Aaron Blogg, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 707 days.

(21) Appl. No.: 18/072,153

(22) Filed: Nov. 30, 2022

(65) Prior Publication Data

US 2024/0177054 A1 May 30, 2024

(51) Int. Cl.
*G06N 3/0895* (2023.01)
*G06N 20/00* (2019.01)
(Continued)

(52) U.S. Cl.
CPC ........... *G06N 20/00* (2019.01); *G06N 3/0895* (2023.01); *H04L 51/02* (2013.01); *H04L 63/1425* (2013.01); *G06Q 40/06* (2013.01)

(58) Field of Classification Search
CPC ...... G06N 20/00; G06N 3/0895; H04L 51/02; H04L 63/1425; G06Q 40/06
See application file for complete search history.

(56) References Cited

U.S. PATENT DOCUMENTS 9,230,280 B1 1/2016 Maag et al.
9,792,020 B1 10/2017 Kelley et al.
(Continued)

FOREIGN PATENT DOCUMENTS

WO 2017196821 A1 11/2017
WO 2021083837 A1 5/2021
WO 2022147746 A1 7/2022

OTHER PUBLICATIONS

Munoz, Eduardo "Attention is all you need: Discovering the Transformer paper," Towards Data Science, Nov. 2, 2020, pp. 29.
(Continued)

*Primary Examiner* — Beau D Spratt
(74) *Attorney, Agent, or Firm* — Banner & Witcoff, Ltd.

(57) ABSTRACT

A system for identifying false positives about a user and closing resulting alerts before the alert consumes system resources may use machine learning techniques including clustering and multi-labeling classification to effectively categorize prior text-based notes. The categorized notes may be used to identify and automatically close false positive alerts. Moreover, weak labeling, AI transformers/sentence transformation, and/or k-means cluster analysis may be used to condense large quantities of textual data into ML model components with improved interpretability. Customer relationship management (CRM) platform and Risk Management Supervision (RMS) note analysis captures past work and leverages it to reduce redundancies in future expert user/supervisory/customer advisory efforts. The various ML techniques disclosed herein output numerical features for improved alert triaging.

18 Claims, 10 Drawing Sheets

(51) Int. Cl.
    *H04L 9/40*          (2022.01)
    *H04L 51/02*        (2022.01)
    *G06Q 40/06*       (2012.01)

(56)           References Cited

U.S. PATENT DOCUMENTS

| | | | | |
|---|---|---|---|---|
| 10,504,338 | B2 * | 12/2019 | Reiter | G08B 5/22 |
| 10,681,060 | B2 * | 6/2020 | Scheidler | G06N 20/00 |
| 11,055,616 | B2 | 7/2021 | Dalli et al. | |
| 11,196,862 | B1 | 12/2021 | Krebs et al. | |
| 11,275,815 | B2 | 3/2022 | Siani Cohen et al. | |
| 11,558,506 | B1 * | 1/2023 | Cardillo | G10L 17/26 |
| 11,803,797 | B2 * | 10/2023 | Nag | G06F 40/284 |
| 2004/0249650 | A1 * | 12/2004 | Freedman | G06Q 30/0201 |
| | | | | 705/7.29 |
| 2011/0047044 | A1 | 2/2011 | Wright et al. | |
| 2017/0178145 | A1 | 6/2017 | Adrian et al. | |
| 2018/0089681 | A1 | 3/2018 | Fenimore et al. | |
| 2019/0289058 | A1 | 9/2019 | Bhoj et al. | |
| 2020/0336503 | A1 * | 10/2020 | Xu | G06F 11/0772 |
| 2021/0232956 | A1 * | 7/2021 | Sreedhar | G06F 16/215 |
| 2022/0108179 | A1 | 4/2022 | Dalli et al. | |
| 2022/0129724 | A1 | 4/2022 | Feinson et al. | |
| 2022/0198254 | A1 | 6/2022 | Dalli et al. | |
| 2022/0201030 | A1 | 6/2022 | Petit et al. | |
| 2022/0253456 | A1 | 8/2022 | Grewal et al. | |
| 2022/0292427 | A1 | 9/2022 | Acuff et al. | |
| 2023/0045930 | A1 | 2/2023 | Can et al. | |
| 2023/0113752 | A1 | 4/2023 | Jorlett et al. | |
| 2023/0360421 | A1 | 11/2023 | Luo et al. | |
| 2024/0028913 | A1 * | 1/2024 | Sznajder | G06N 3/0475 |
| 2024/0086298 | A1 * | 3/2024 | Baatout | G06F 18/285 |

OTHER PUBLICATIONS

Kumar, Satyam, "Fuzzy C-Means Clustering—Is it Better than K-Means Clustering?," Towards Data Science, Apr. 4, 2021, pp. 7.
Petrus et al. "Soft and Hard Clustering for Abstract Scientific Paper in Indonesian," IEEE Xplore, Feb. 6, 2020, pp. 3.
Khandelwal, Renu, "Intuitive Explanation of BERT-Bidirectional Transformers for NLP," Towards Data Science, Apr. 16, 2020, pp. 11.
Malik, Farhad, "Machine Learning Hard Vs Soft Clustering," FinTechExplained, Jun. 6, 2019, pp. 6.
Nguyen, Xuan-Bac et al., "Clusformer: A Transformer based Clustering Approach to Unsupervised Large-scale Face and Visual Landmark Recognition", CVPR (2021), pp. 10.
Sharma, R. "What is Clustering and Different Types of Clustering Methods," upGrad blog, 2022, pp. 19.
Apr. 8, 2025—(US) Final Office Action—U.S. Appl. No. 18/072,042.
Sep. 17, 2025—(US) Non-Final Office Action—U.S. Appl. No. 18/072,042.
Oct. 1, 2024—(US) Non-Final Office Action—U.S. Appl. No. 18/072,042.
Sinaga et al., "Unsupervised K-Means Clustering Algorithm", IEEE Access, Digital Object Identifier 10.1109/ACCESS.2020.2988796, vol. 8, 2020, p. 80716-80727.
Feb. 18, 2026—(US) Final Office Action—U.S. Appl. No. 18/072,042.

* cited by examiner

100

502
unstructured conversation thread
RMS note #1    RMS note #2    ● ● ●    RMS note #3
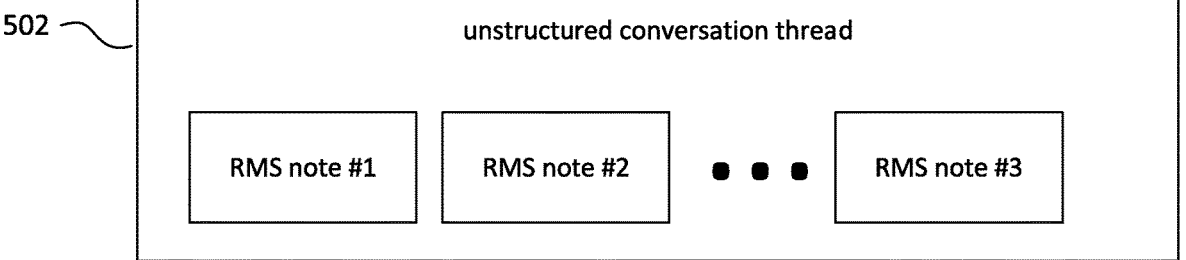
504
| | Key Word 1 | Key Word 2 | ... | Key Word N |
|---|---|---|---|---|
| RMS Note 1 | 1 | 2 | 0 | 4 |
| RMS Note 2 | 3 | 1 | 2 | 0 |
| ... | 0 | 4 | 1 | 1 |
| RMS Note N | 0 | 3 | 1 | 2 |
Word Frequencies
506
| |
|---|
| (1,2,0,4) |
| (3,1,2,0) |
| (0,4,1,1) |
| (0,3,1,2) |
=
| |
|---|
| $(x_1, y_1)$ |
| $(x_2, y_2)$ |
| $(x_3, y_3)$ |
| $(x_4, y_4)$ |
Dimension Reduction
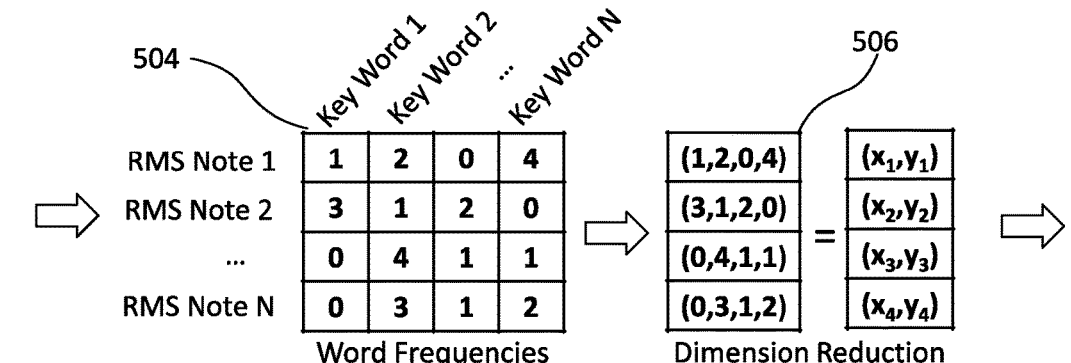
FIG.5

602
unstructured conversation thread
| CMS note #1 | CMS note #2 | ● ● ● | CMS note #3 |
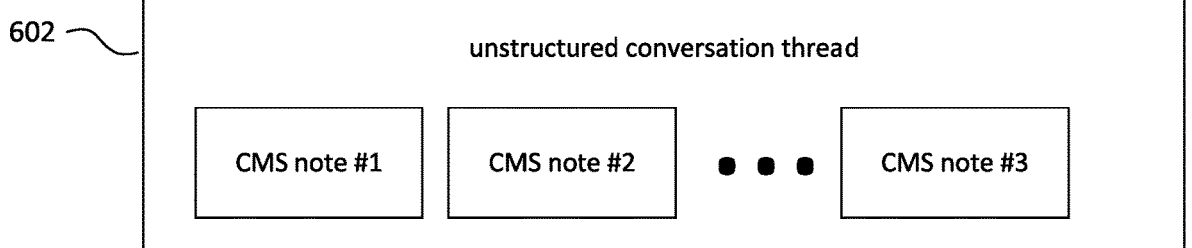
604
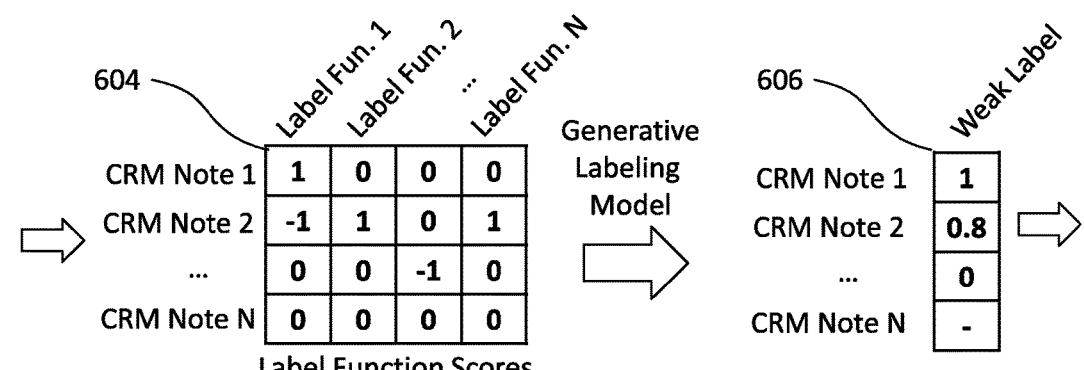
|  | Label Fun. 1 | Label Fun. 2 | ... | Label Fun. N |
|---|---|---|---|---|
| CRM Note 1 | 1 | 0 | 0 | 0 |
| CRM Note 2 | -1 | 1 | 0 | 1 |
| ... | 0 | 0 | -1 | 0 |
| CRM Note N | 0 | 0 | 0 | 0 |
Label Function Scores
Generative
Labeling
Model
606
| | Weak Label |
|---|---|
| CRM Note 1 | 1 |
| CRM Note 2 | 0.8 |
| ... | 0 |
| CRM Note N | - |
FIG.6                    600

Sentence : Question Relevance

700

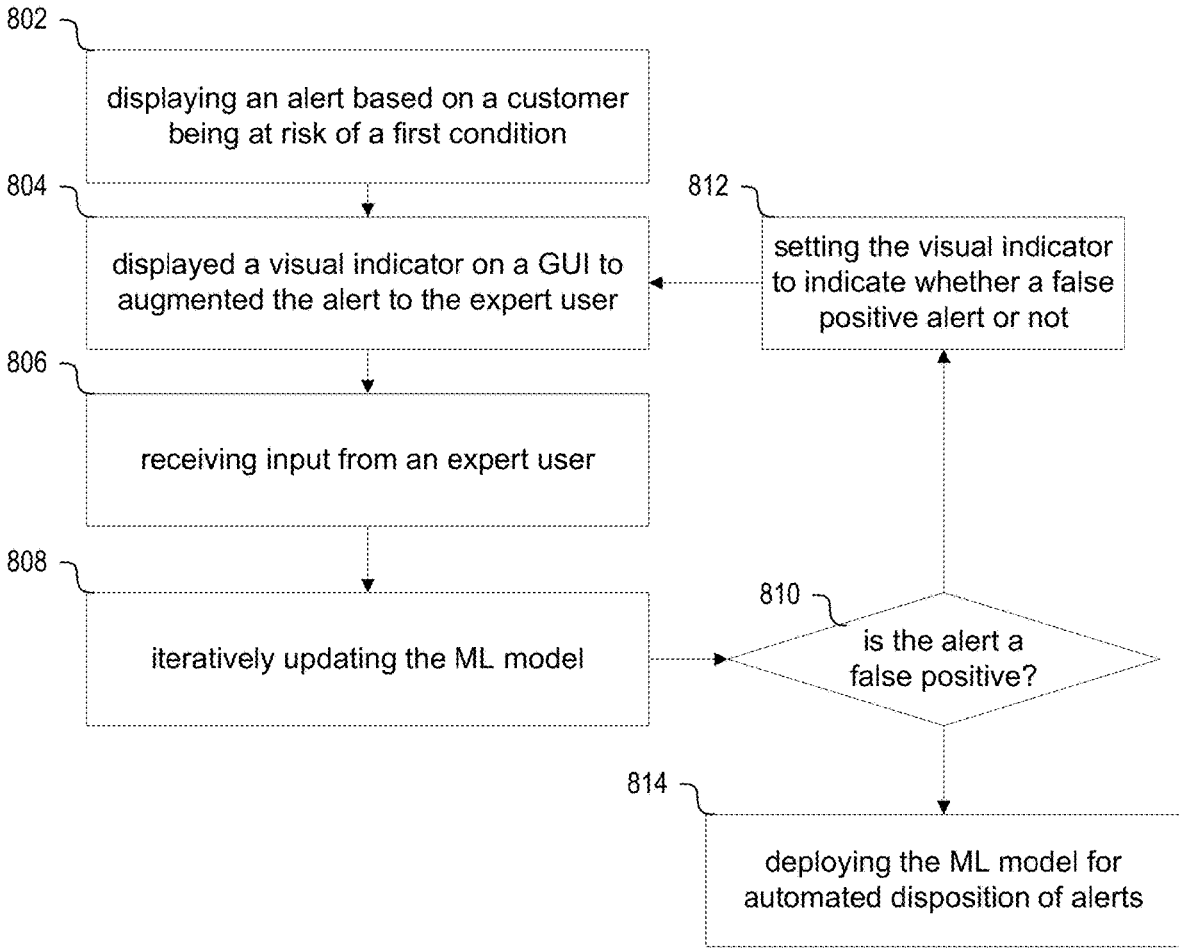

802 displaying an alert based on a customer being at risk of a first condition

804 displayed a visual indicator on a GUI to augmented the alert to the expert user

812 setting the visual indicator to indicate whether a false positive alert or not

806 receiving input from an expert user

808 iteratively updating the ML model

810 is the alert a false positive?

814 deploying the ML model for automated disposition of alerts

AUTOMATIC ALERT DISPOSITIONING USING ARTIFICIAL INTELLIGENCE

BACKGROUND

Many organizations have computer software to assist in preemptively identifying and addressing potential concerns with its customers or clients. Such software typically triggers alerts that a customer service advisor (e.g., supervision principals) would then spend time and effort to address. However, upon manual review, a notable portion of these computer-generated, risk-related alerts are closed without escalation. Time inefficiencies result when supervision principals investigate large volumes of false-positive alerts. One or more disadvantages in prior art systems for generating alerts could be improved by, among other things, reducing false positive alerts.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues in the prior art with analyzing large quantities of textual data. Weak labeling, AI transformers/sentence transformation, and/or k-means cluster analysis provide a means for condensing large quantities of textual data into ML model components with improved interpretability. Customer relationship management (CRM) platform and Risk Management Supervision (RMS) note analysis captures inefficiently/ineffectively organized past work and leverages it to reduce redundancies in future expert user/supervisory/ customer advisory efforts. The various ML techniques disclosed herein output numerical features that directly improve model performance for alert triaging as a whole. Streamlining the presentation of large textual data to reviewers/users (e.g., supervision principals) as individual sentences or numerical values greatly improves explainability as a byproduct.

Aspects of this disclosure provide effective, efficient, scalable, and convenient technical solutions that address various issues associated with alert triaging. A large subset of computer-generated, risk-related alerts are closed without escalation upon manual review. Time-inefficiencies result when users (e.g., supervision principals) investigate large volumes of false-positive alerts. Systems and methods are disclosed herein for the reduction of false-positive alerts by an alert triaging system that uses machine learning (ML).

In one embodiment, the system may apply self-supervised ML and/or NLP systems that leverage an (artificial intelligence driven) AI-driven text classification engine in addition to client demographic, risk, and/or performance metrics to automatically close the alerts deemed to be non-issues.

In some embodiments, the system intakes unstructured conversation threads from a risk management supervision (RMS) program and customer relationship management (CRM) platform, and applies tailored processes to each of them to output relevance scores pertaining to specific risk alert scenarios.

In some embodiments, numerical and/or categorical features associated with the account or client of an alert are aggregated for inclusion as model features. For example, prior occurrences of alerts or contacts, total assets, recent losses, types of securities traded, as well as client birthdate and risk tolerance may play heavily into the alert closure decision making process.

One novel aspect of some embodiments disclosed herein includes inputting into the predictive model a numeric value that is not simply the output of clustering, which are categorizations, but rather to calculate and use the distance between a text to the centroid of the clustering to which it belongs, similar to soft clustering.

One novel aspect of some embodiments disclosed herein includes generating an overall relevance score of the text by combining a clustering method with at least Sentence-Transformers and/or Weak Labeling methods disclosed herein.

These and additional aspects will be appreciated with the benefit of the disclosures discussed in further detail below. Moreover, the figures herein illustrate the foregoing embodiments in detail.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 5 depicts an illustrative transformation of risk management supervision (RMS) notes in accordance with one or more illustrative aspects described herein.

FIG. 6 shows an illustrative transformation of customer relationship management (CRM) notes in accordance with one or more illustrative aspects described herein.

FIG. 8 shows an illustrative flowchart of steps performed by a system for displaying an alert for an expert/supervisory user with augmented information to indicate likelihood of a false positive alert in accordance one or more illustrative aspects described herein.

DETAILED DESCRIPTION

Figure 1:
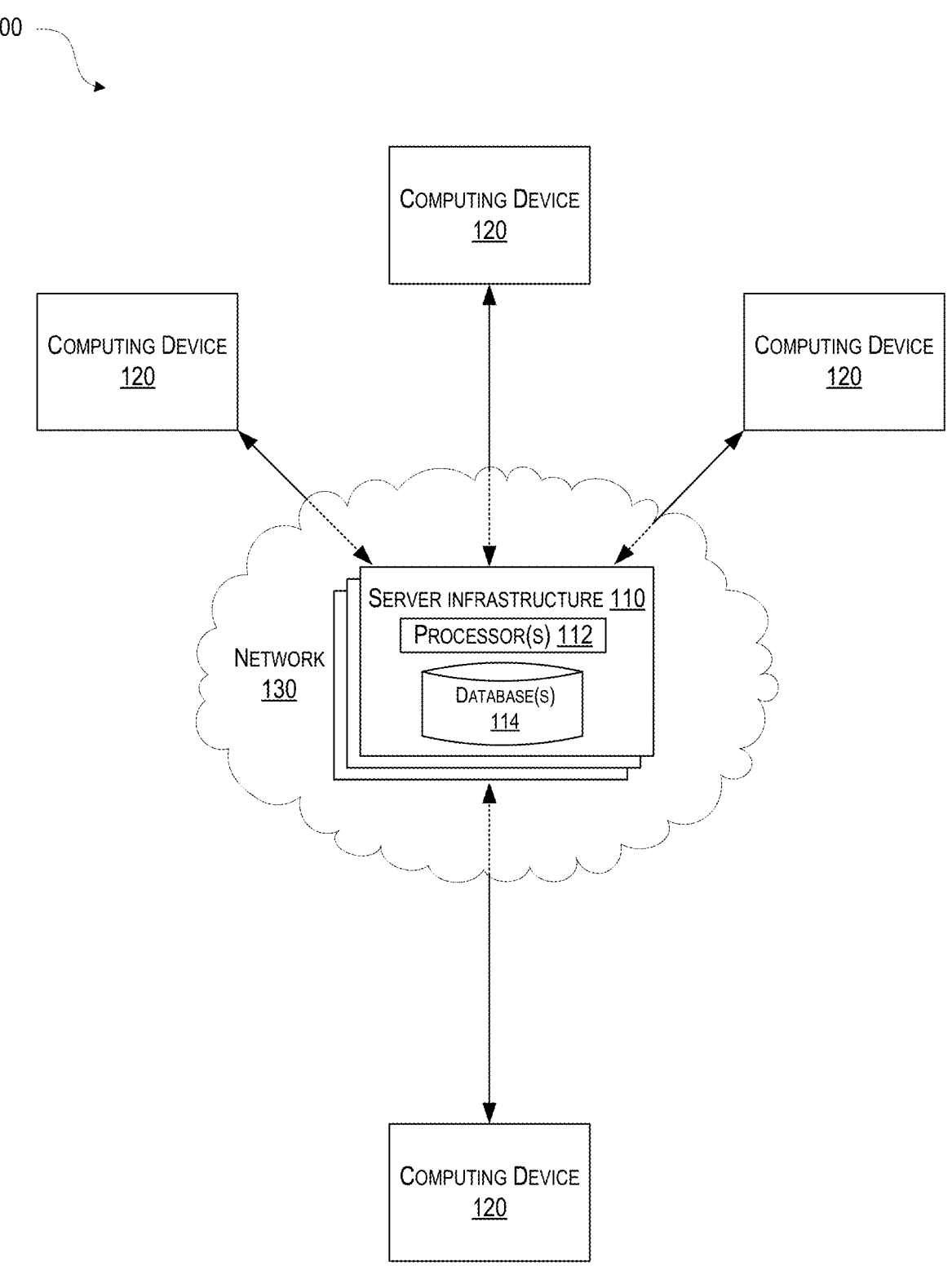
FIG. 1 depicts an illustrative example of a computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Moreover, the use of "client" and "customer" and variations thereof is meant to broadly cover any human user receiving customer service, and the terms are used interchangeably in this disclosure.

As a general introduction to the subject matter described in more detail below, aspects described herein are directed towards the methods and systems disclosed herein. One aspect of this disclosure provides effective, efficient, scalable, and convenient technical solutions that address various issues associated with identifying and closing user alerts, as false positives before the alert wastefully consume system resources. The user alerts are alerts generated by an electronic system that flag the specific user as appropriate for a customer service advisor to contact to inquire about a particular topic—e.g., poor account performance, sizable administrative account charges, and the like. In contrast to some prior art systems that might rely on manual, supervised learning techniques that require substantial expert user effort to manually label and classify each prior note saved in a data store, several embodiments disclosed herein use a novel combination of machine learning techniques including clustering and multi-label classifications to effectively categorize prior text-based notes to efficiently identify and automatically close false positive alerts.

In addition, another aspect of this disclosure provides effective, efficient, scalable, and convenient technical solutions that address various issues associated with identifying and closing user alerts, as false positives before the alert wastefully consume system resources. In particular, weak labeling using machine learning, AI transformers/sentence transformation, and/or k-means cluster analysis provide a means for condensing large quantities of textual data into ML model components with improved interpretability. Customer relationship management (CRM) platform and Risk Management Supervision (RMS) note analysis captures inefficiently/ineffectively organized past work and leverages it to reduce redundancies in future expert user/supervisory/customer advisory efforts. The various ML techniques disclosed herein output numerical features that directly improve model performance for alert triaging as a whole. Streamlining the presentation of large textual data to reviewers/users (e.g., supervision principals) as individual sentences or numerical values greatly improves explainability as a byproduct.

FIG. 1 depicts an illustrative example of computer system 100 in accordance with one or more illustrative aspects described herein. Computer system 100 may comprise one or more computing devices including at least server infrastructure 110 and computing devices 120. Each of computing devices 120 may be configured to communicate with server infrastructure 110 through network 130. In some arrangements, computer system 100 may include additional computing devices and networks that are not depicted in FIG. 1, which also may be configured to interact with server infrastructure 110 and, in some instances, computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks and for interacting with computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate data received from the various computing devices 120, which may be stored in databases 114.

Each of the computing devices 120 may be configured to interact with server infrastructure 110 through network 130. In some instances, one or more of the computing devices 120 may be configured to receive and transmit information corresponding to system requests through particular channels and/or representations of webpages and/or applications associated with server infrastructure 110. The system requests provided by computing devices 120 may initiate the performance of particular computational functions such as data and/or file transfers at server infrastructure 110. In such instances, the one or more of the computing devices may be internal computing devices associated with the particular entity corresponding to server infrastructure 110 and/or may be external computing devices which are not associated with the particular entity.

As stated above, computer system 100 also may include one or more networks, which may interconnect one or more of server infrastructure 110 and one or more computing devices 120. For example, computer system 100 may include network 130. Network 130 may include one or more sub-networks (e.g., local area networks (LANs), wide area networks (WANs), or the like). Furthermore, computer system 100 may include a local network configured to interlink each of the computing devices comprising server infrastructure 110.

Furthermore, in some embodiments, computer system 100 may include a plurality of computer systems arranged in an operative networked communication arrangement with one another through a network, which may interface with server infrastructure 110, computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the computer system 100 described in regard to FIG. 1, server infrastructure 110 may serve as a central authority which manages at least a portion of the computing data and actions performed in relation to the particular entity associated with server infrastructure 110. As will be described in further detail below in regard to FIG. 2, decentralized computing arrangements are also contemplated and disclosed herein such that server infrastructure 110 need not be centralized.

Figure 2:
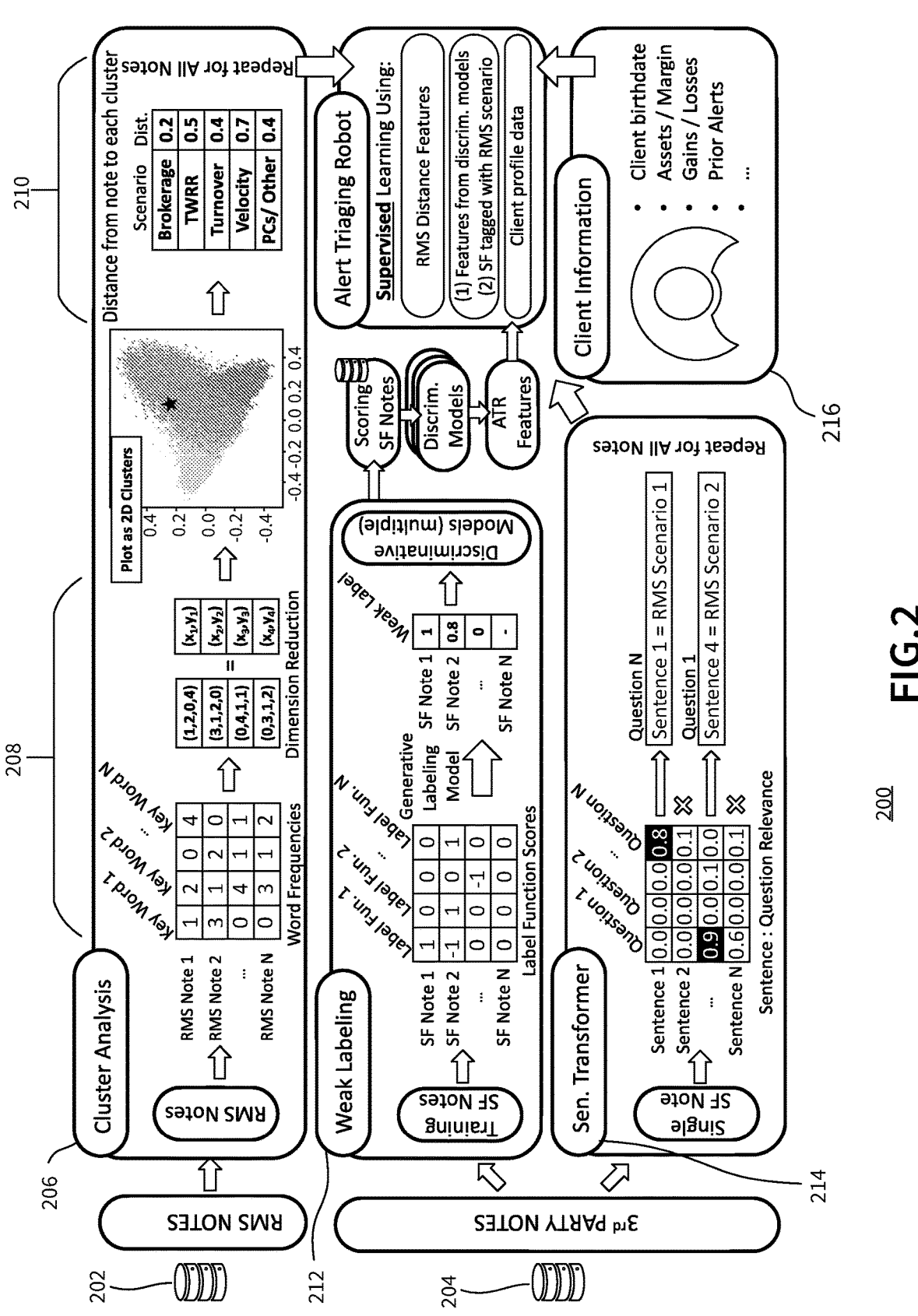
FIG. 2 depicts an illustrative system for identifying and automatically disposing of false positive alerts in accordance with one or more illustrative aspects described herein.

Referring to FIG. 2, a system 200 is illustrated for identifying and automatically disposing of false positive alerts. The system 200 relies upon various machine learning techniques and a machine learning (ML) model that was created using risk management supervision (RMS) notes stored in a data store 202. Meanwhile, customer relationship management (CRM) platform notes and other $3^{rd}$ party notes may be stored in data store 204. The RMS notes include one or more textual keywords and are associated with the original alert/alert type generated. The RMS notes are received as concatenated conversation strings, each associated with a past alert belonging to one of any of a plurality of client review scenarios or concentration scenario. In some examples, the number of client review scenarios may be five client review archetypes, but the disclosed system is not so limited. In other examples, the number of scenarios (whether client review or concentration) may be more, less, or other than five. Alerts are generated with one or more scenario labels, but the relevance of the RMS notes saved as a result of an interaction due to the alert and the preassigned label is not guaranteed or trustworthy; hence the system treats the input dataset at the RMS notes data store 202 using an unsupervised machine learning approach.

In FIG. 2, the system 206 for RMS note analysis is configured to train a ML model to triage alerts. A core ML engine 208 configured to filter particular keywords, build a text-frequency matrix, reduce a dimension of the matrix, output numerical representations of textual notes, and other ML functions is illustrated in FIG. 2. The subsystem 208 and core ML engine 208 may be used interchangeably in this disclosure, but the subsystem 208 encompasses illustrative embodiments in which one or more ML functions may be omitted yet a core ML engine 208 is included in the subsystem 208. For example, steps of filtering particular keywords may be omitted in a subsystem 208, in some examples, but the particular subsystem 208 would still include a core ML engine 208 to perform the basic ML functions necessary to provide the input needed for subsystem 210 to output a multi-classification relevance score.

In one example, the ML model may be created by steps comprising filtering keywords in a plurality of textual notes to remove a first set of keywords that fail to correspond to any specific scenario among the enumerated list of scenarios. For example, this may include filtering generic words/stop words that are noise such as generic, frequently used language that do not correspond to a particular scenario. Some examples might include, depending on the context, "Client", "Account", "Alert," as well as standard stop words such as "the", "and", and numerical characters.

Then after the filtering of the keywords, the system 206 transforms the plurality of textual notes into a text-frequency matrix, as illustrated in FIG. 5. The first set of keywords, which were eliminated in a prior step, are omitted from the text-frequency matrix. Moreover, each row of the text-frequency matrix represents a different textual note. Next, in some examples, the text-frequency matrix is outputted as numerical representations.

Notably, the outputted numerical representations from the subsystem 208 are used for clustering (e.g., k-means clustering, specifically of a soft clustering type as compared to a hard clustering type) to produce a plurality of clusters. The clustering is performed between subsystems 208 and 210. And each cluster corresponds to a single scenario in an enumerated list of scenarios. For example, in one example, the system 200 may designate an enumerated list of five scenarios such as concentration, production credit (e.g., commission), charges, velocity, and TWRR (time-weighted rate of return). In other examples, the enumerated list may be as illustrated in FIG. 2 for subsystem 210: brokerage, TWRR, turnover, velocity, and production credit/other. In one example for each cluster, the system 206 identifies the average clustering of words in a RMS note to arrive at a numeric representation that can be represented in a cluster formation. The ML model in system 206 infers a likelihood that the customer was previously notified of a particular scenario by clustering numerical representations of the textual notes, which represent interactions between the customer service advisor and the customer, in relation to the enumerated list of scenarios. In some examples, a textual RMS note may contain relevant information for more than one subscenario, in which case it could be located between multiple centroids. Instead of assigning each note to its nearest center, the system 206 retains all distances for use as model features. The system disclosed herein measures the numeric distance to the centroid of each and every cluster, and does so for each cluster. Thus, outputting a multi-classification relevance score by the ML model. The numeric value for with respect to each cluster/category serves as a relevance measure/score for each corresponding cluster/alert type; thus, the multi-classification relevance score corresponds to a likelihood that a particular note belongs to a scenario.

In some examples, for a complete picture of a customer, an N-year history of RMS notes for a customer (and/or account) may be aggregated for each new alert. The minimum distance-to-center among past notes for each of the enumerated subscenarios provides evidence whether the customer has previously been made aware of that risk type.

Referring to FIG. 2, subsystem 210 is configured to output the multi-classification relevance score, as illustrated in FIG. 2. The "dist" is the distance measure for each scenario list in the table. For each textual note, the subsystem 210 outputs a multi-classification relevance score that includes a quantity of scores matching a quantity of clusters in the plurality of clusters. Each score in the multi-classification relevance score is calculated as a distance from the corresponding numerical representation to a centroid of a corresponding cluster. Notably, as with soft clustering, the subsystem 210 results in a plurality of relevance scores for each RMS note (or other textual notes) instead of a single number/label, as with hard clustering. In fact, using the multi-classification relevance score disclosed herein, the disclosed ML model is flexible enough to measure each note against every scenario in an enumerated list of scenarios. In other words, the ML model and subsystems 208, 210 are designed to accommodate multiple classes in a textual note.

In FIG. 2, a weak labeling system 212 is configured to receive the CRM notes to train a ML model to triage alerts. The weak labeling system 212 builds a matrix, as illustrated in FIG. 6. The results of the weak labeling system 212 are aggregated by applying user-defined labeling functions to the CRM notes. The aggregated results provide a holistic weak label for each CRM note provided to the weak labeling system 212. The heuristic labels, which are generated by the weak labeling system 212 after the aggregating step, are used to train multiple discriminative model. The resulting relevance scores for each CRM note are stored in a data store that ultimately feeds into the alert triaging robot.

In some examples, the output of a weak labeling system 212 may be stored in a data store holding scores for CMS notes. The scoring is applied to one or more discriminatory models. And, feature engineering may be performed such that features from the discriminatory models are identified for an alert triage robot or other system implementing the ML model. Moreover, appropriate CMS notes are tagged with RMS scenario.

Referring to FIG. 2, an AI sentence transformer 214 is configured to receive the CRM notes and program a transformer 212 to triage alerts. In some examples, the transformer 212 is a sentence transformer 380, as illustrated in FIG. 3B, configured to receive two types of inputs: (1) raw text from a customer relationship management (CRM) platform, and (2) and a series of user-defined questions. The transformer 380 may leverage positional encoding and multi-head attention layers (e.g., masked multi-head attention layers) to output probabilities—i.e., the user-defined questions correspond to the features for the predictive model to perform feature engineering. The output of the transformer 214 contributes to improving the accuracy of the ability of the machine learning system 200 to predict the likelihood of a false positive alert.

Moreover, the accuracy is further improved by ML soft clustering of the output of a word frequency matrix by system 206, ML weak labeling of CRM notes by system 212, and use of client information 216. For example, prior occurrences of alerts or contacts, total assets, recent losses, types of securities traded, as well as demographics (e.g., customer/client birthdate) and risk tolerance may play a factor in the alert closure decision making process—e.g., by applying ML and/or natural language processing (NLP) systems that leverage customer demographic, risk, and/or performance metrics to automatically close the alerts deemed to be non-issues. Other examples of client information 216 would become apparent to a person skilled in the art after the review of the entirety disclosed herein. In some embodiments, numerical and/or categorical features associated with the account or customer of an alert may be aggregated for inclusion as model features. In such examples, client information 216 is used to adjust the performance and output of a machine learning (ML) model. The aforementioned numerical and/or categorical features associated with the customer may be used to updated one or more hyperparameters of the ML model underlying the alert triaging robot such that the accuracy of calculating the likelihood of false positive is enhanced. This may mean that the plurality of clusters produced by the ML model are more accurate and/or precise.

While a couple examples of CRM note relevance scoring methods are described above in FIG. 2, the disclosed system 200 and methods are not so limited. Other modifications and techniques would be apparent to a person having ordinary skill in the art after review of the entirety disclosed herein.

FIG. 3 illustrates simplified examples of artificial neural networks 300, 380 on which a machine learning algorithm may be executed. FIG. 3 is merely an example of nonlinear processing using an artificial neural network; other forms of nonlinear processing may be used to implement a machine learning algorithm in accordance with features described herein.

By way of background, a framework for machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human mind). Such structures, while significantly more complex than conventional computer systems, are beneficial in implementing machine learning. For example, an artificial neural network may be comprised of a large set of nodes which, like neurons in humans, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator. An embodiment involving unsupervised machine learning is described herein.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 100 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct"). An embodiment involving supervised machine learning is described herein.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

As elaborated herein, in practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

Figure 3A:
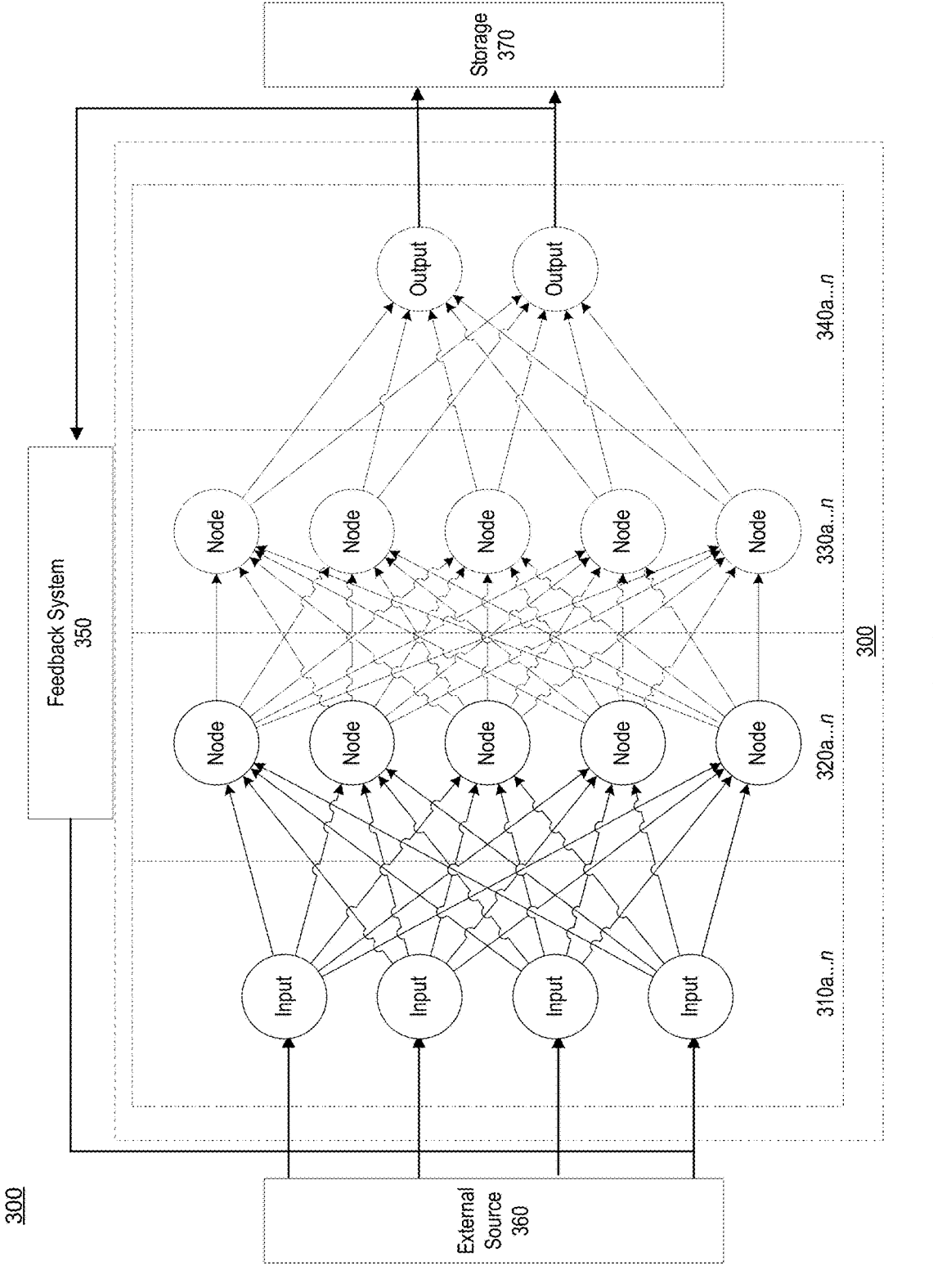
FIG. 3A and FIG. 3B (collectively referred to as "FIG. 3") show illustrative artificial neural networks, including a transformer architecture, on which one or more machine learning algorithms may be executed in accordance with one or more examples described herein.
Figure 3B:
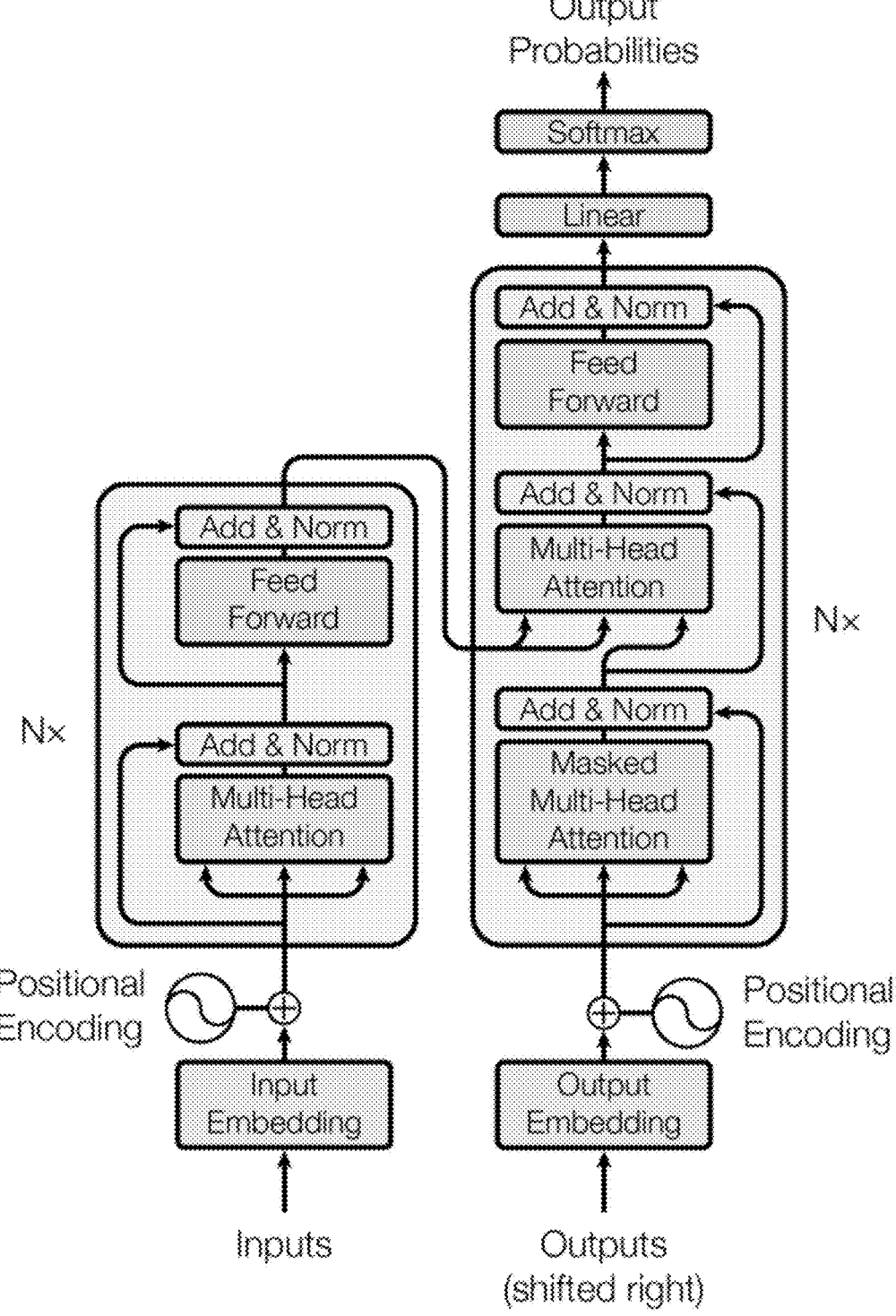

In FIG. 3A, each of input nodes 310a-n is connected to a first set of processing nodes 320a-n. Each of the first set of processing nodes 320a-n is connected to each of a second set of processing nodes 330a-n. Each of the second set of processing nodes 330a-n is connected to each of output nodes 340a-n. Though only two sets of processing nodes are shown, any number of processing nodes may be implemented. Similarly, though only four input nodes, five processing nodes, and two output nodes per set are shown in FIG. 3A, any number of nodes may be implemented per set. Data flows in FIG. 3A are depicted from left to right: data may be input into an input node, may flow through one or more processing nodes, and may be output by an output node. Input into the input nodes 310a-n may originate from an external source 360. Output may be sent to a feedback system 350 and/or to storage 370. The feedback system 350 may send output to the input nodes 310a-n for successive processing iterations with the same or different input data.

In one illustrative method using feedback system 350, the system may use machine learning to determine an output. The output may include anomaly scores, heat scores/values, confidence values, and/or classification output. The system may use any machine learning model including xgboosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multidimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tan h function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network, the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses.

In one example, FIG. 3A depicts nodes that may perform various types of processing, such as discrete computations, computer programs, and/or mathematical functions implemented by a computing device. For example, the input nodes 310a-n may comprise logical inputs of different data sources, such as one or more data servers. The processing nodes 320a-n may comprise parallel processes executing on multiple servers in a data center. And, the output nodes 340a-n may be the logical outputs that ultimately are stored in results data stores, such as the same or different data servers as for the input nodes 310a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3A, connections may be formed between any nodes. For example, one processing node may be configured to send output to a previous processing node.

Input received in the input nodes 310a-n may be processed through processing nodes, such as the first set of processing nodes 320a-n and the second set of processing nodes 330a-n. The processing may result in output in output nodes 340a-n. As depicted by the connections from the first set of processing nodes 320a-n and the second set of processing nodes 330a-n, processing may comprise multiple steps or sequences. For example, the first set of processing nodes 320a-n may be a rough data filter, whereas the second set of processing nodes 330a-n may be a more detailed data filter.

The artificial neural network 300 may be configured to effectuate decision-making. As a simplified example for the purposes of explanation, the artificial neural network 300 may be configured to detect faces in photographs. The input nodes 310a-n may be provided with a digital copy of a photograph. The first set of processing nodes 320a-n may be each configured to perform specific steps to remove non-facial content, such as large contiguous sections of the color red. The second set of processing nodes 330a-n may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 100 may then predict the location on the face. The prediction may be correct or incorrect.

The feedback system 350 may be configured to determine whether or not the artificial neural network 300 made a correct decision. Feedback may comprise an indication of a correct answer and/or an indication of an incorrect answer and/or a degree of correctness (e.g., a percentage). For example, in the facial recognition example provided above, the feedback system 350 may be configured to determine if the face was correctly identified and, if so, what percentage of the face was correctly identified. The feedback system 350 may already know a correct answer, such that the feedback system may train the artificial neural network 100 by indicating whether it made a correct decision. The feedback system 350 may comprise human input, such as an administrator telling the artificial neural network 300 whether it made a correct decision. The feedback system may provide feedback (e.g., an indication of whether the previous output was correct or incorrect) to the artificial neural network 300 via input nodes 310a-n or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to identify faces, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 100, such that the artificial neural network 100 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 100 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). For example, the machine learning algorithm 300 may be asked to detect faces in photographs. Based on an output, the feedback system 350 may indicate a score (e.g., 75% accuracy, an indication that the guess was accurate, or the like) or a specific response (e.g., specifically identifying where the face was located).

The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning.

In another example, an unsupervised machine learning engine may use an autoencoder technique to detect anomalies within the graph. The autoencoder may be constructed with a number of layers that represent the encoding portion of the network and a number of layers that represent the decoding portion of the network. The encoding portion of the network may output a vector representation of inputs into the encoder network, and the decoding portion of the network may receive as input a vector representation generated by the encoding portion of the network. It may then use the vector representation to recreate the input that the encoder network used to generate the vector representation.

The autoencoder may be trained on historical data or feature vectors that are known to not be fraudulent. By training on non-fraudulent feature vectors, the autoencoder may learn how a non-fraudulent entity behaves. When the autoencoder encounters a feature vector that is different from the feature vectors it has trained on, the unsupervised machine learning engine may flag the feature vector as potentially fraudulent.

The autoencoder may be a variational autoencoder, in some examples. The variational autoencoder may include the components of the autoencoder. The variational autoencoder may also include a constraint on its encoding network that forces it to generate vector representations of inputs according to a distribution (e.g., a unit Gaussian distribution).

In yet another example, attention layers and positional embeddings may be used in a sophisticated neural network architecture called a transformer 380, as illustrated in FIG. 3B.

Referring to FIG. 3B, a multi-head attention layer and masked multi-head attention layer are some of the key features of a transformer 380 that enables it to assist in triaging alerts. The inputs and outputs, attention layers, and feed forwards of the transformer 214 are configured to receive two types of inputs: (1) raw text from a customer relationship management (CRM) platform, and (2) and a series of user-defined questions. Moreover, the transformer 380 may leverage positional encoding and multi-head attention layers (e.g., masked multi-head attention layers), as illustrated in FIG. 3B, to output probabilities—i.e., the user-defined questions correspond to the features for the predictive model to perform feature engineering. The output of the transformer 214 contributes to improving the accuracy of the ability of the machine learning system 200 to predict the likelihood of a false positive alert.

Figure 4:
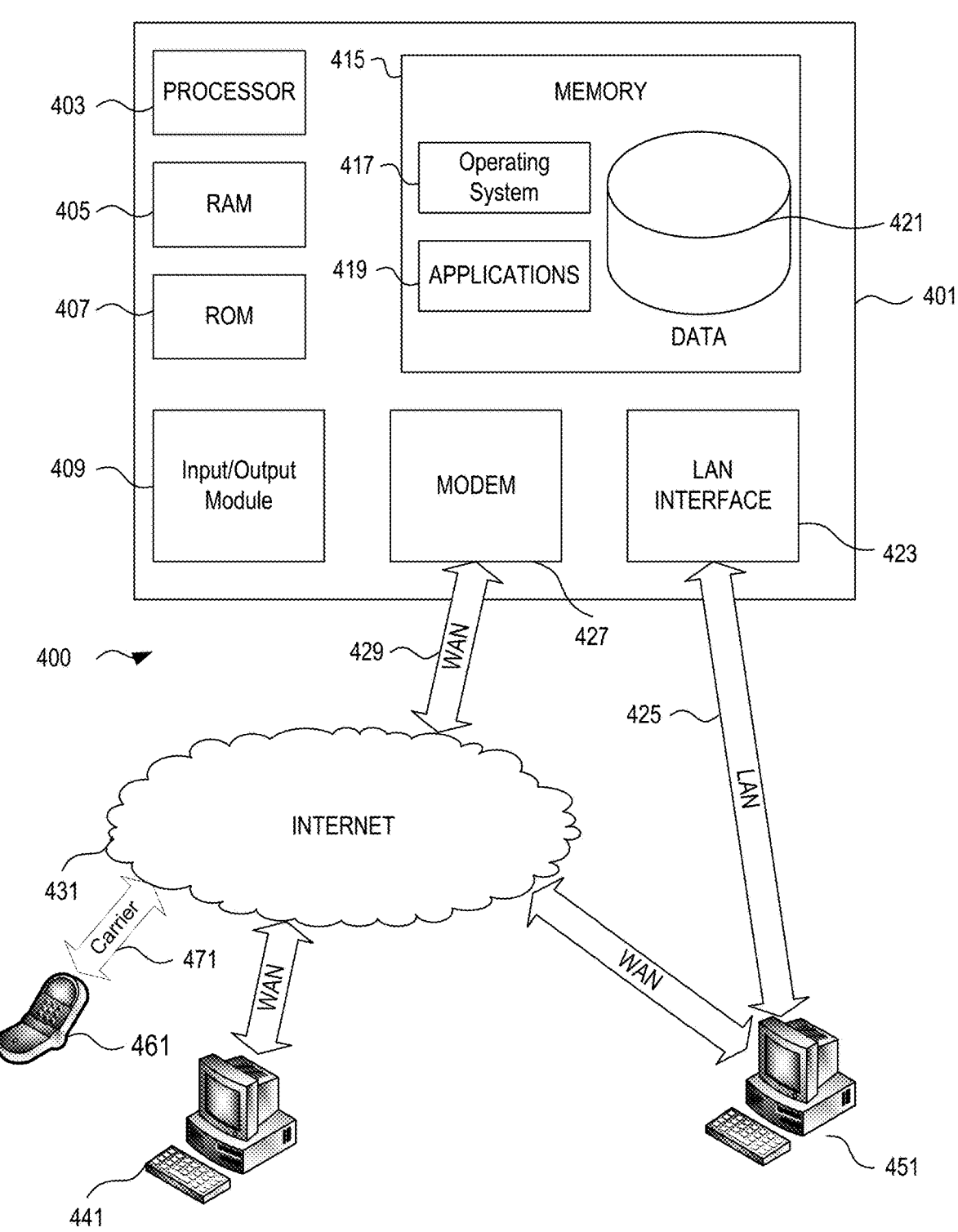
FIG. 4 depicts an illustrative example of a suitable computing system environment that may be used in accordance with one or more illustrative aspects described herein.

FIG. 4 illustrates an example of a computing system environment 400 that may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the computing system environment 400.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, the computing system environment 400 may include a computing device 401 wherein the processes discussed herein may be implemented. The computing device 401 may have a processor 403 for controlling overall operation of the computing device 401 and its associated components, including random-access memory (RAM) 405, read-only memory (ROM) 407, input/output module or communications module 409, and memory 415. Computing device 401 typically includes a variety of computer readable media. Computer readable media may be any available media that may be accessed by computing device 401 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 401.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 400 may also include optical scanners (not shown). Exemplary usages include scanning and converting paper documents, e.g., correspondence, receipts to digital files.

Although not shown, RAM 405 may include one or more applications representing the application data stored in RAM 405, while the computing device is on and corresponding software applications (e.g., software tasks) are running on the computing device 401.

Communications module 409 may include a microphone, keypad, touch screen, and/or stylus through which a user of computing device 401 may provide input, and may also include one or more of a speaker for providing audio output and a video display device for providing textual, audiovisual and/or graphical output.

Software may be stored within memory 415 and/or storage to provide instructions to processor 403 for enabling computing device 401 to perform various functions. For example, memory 415 may store software used by the computing device 401, such as an operating system 417, application programs 419, and an associated database 421. Also, some or all of the computer executable instructions for computing device 401 may be embodied in hardware or firmware.

Computing device 401 may operate in a networked environment supporting connections to one or more remote computing devices, such as computing devices 441, 451, and 461. The computing devices 441, 451, and 461 may be personal computing devices or servers that include many or all of the elements described above relative to the computing device 401. Computing device 461 may be a mobile device communicating over wireless carrier channel 471.

The network connections depicted in FIG. 4 include a local area network (LAN) 425 and a wide area network (WAN) 429, but may also include other networks. When used in a LAN networking environment, computing device 401 may be connected to the LAN 425 through a network interface, such as LAN interface 423, or to an adapter in the communications module 409. When used in a WAN networking environment, the computing device 401 may include a modem in the communications module 409, a modem separate from the communications module 409, such as modem 427, or other means for establishing communications over the WAN 429, such as the Internet 431 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 419 used by the computing device 401, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 401. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 401. Such a processor may execute computer-executable instructions stored on a computer-readable medium. In an example, the systems and apparatus described herein may correspond to the computing device 401. A computer-readable medium (e.g., ROM 407) may store instructions that, when executed by the processor 403, may cause the computing device 401 to perform the functions as described herein.

Referring to FIG. 5, a textual note inputted to the ML model may be in any number of formats. In one example, the textual notes for a particular customer may be concatenated into an unstructured conversation thread 502. Each RMS note from 1 to N (e.g., 1 to 3) for the customer (and/or account) may be serially adjoined into a long, consecutive string ready for a NLP engine.

In another example, the textual notes from interactions between a customer and an expert user (e.g., service advisor) may be organized and transformed into a text-frequency matrix 504 in which each column represents one of the most frequent N terms (across all notes) and where each row represents a single note. In some examples, the matrix may be a few hundred columns showing the most frequent terms, and each row represents a single RMS note. And the number displayed in the matrix/table is the frequency of the word in that note.

But with a large number of terms and scenarios, then a curse of dimensionality arises. In some examples, the subsystem 208 includes dimension reduction through, for example, principal component analysis (PCA). As a result, as illustrated in FIG. 5, the matrix is reduced to a smaller table 506 such that the system 206 ends up with a distance from each RMS note to each of the scenarios. Determining the number of dimensions to reduce is a function of model performance, and although a specific reduction is shown in FIG. 5, the disclosure is not so limited. Moreover, the disclosure contemplates that dimensionality reduction may be performed by techniques other than PCA.

Referring to FIG. 6, an illustrative transformation is shown of customer relationship management (CRM) notes in accordance with one or more illustrative aspects described herein. The textual CRM notes inputted to a weak labeling system 212 may be in any number of formats. In one example, the CRM notes for a particular customer may be concatenated into an unstructured conversation thread 602. Each CRM note from 1 to N (e.g., 1 to 3) for the customer (and/or account) may be serially adjoined into a long, consecutive string ready for a NLP engine.

In another example, the textual notes from a customer relationship management (CRM) platform may be organized and transformed into a matrix 604 in which each column represents each of user-defined labeling functions and the rows represent each CRM note or group of CRM notes. Using a generative labeling model, the scores in the matrix are aggregated by CRM note into the results 606 of the weak labeling system 212. The results 606 provide a holistic weak label for each CRM note.

Figure 7:
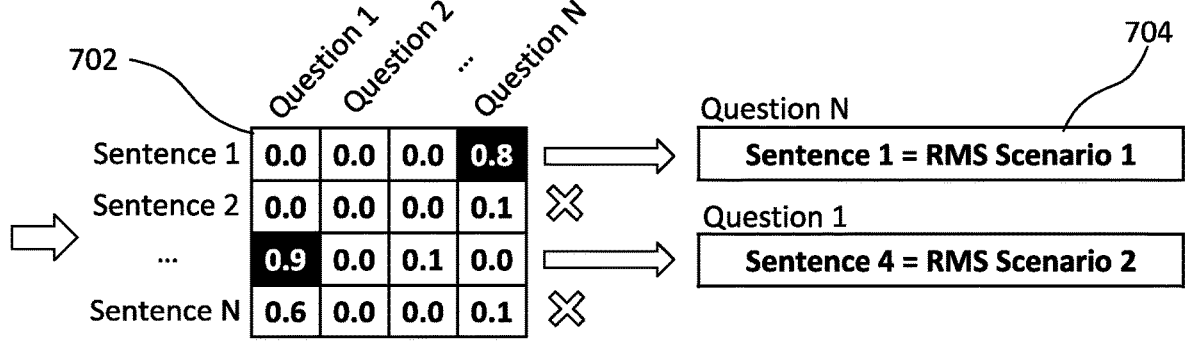
FIG. 7 shows an illustrative matrix of question-CRM note pairs for use in an artificial intelligence (AI) sentence transformer in accordance one or more illustrative aspects described herein.

FIG. 7 shows an illustrative matrix 702 of question-CRM note pairs for use in an artificial intelligence (AI) sentence transformer 214 in accordance one or more illustrative aspects described herein. Examples of user-provided questions include, "were losses discussed?" (or something similar) if the user wishes to test CRM notes for relevance to the time-weighted rate of return (TWRR) risk scenario from among an enumerated list of scenarios. The transformer 214 scores the relevance of each question with respect to each sentence of the CRM note. The relevance score is entered in each cell of the table to capture its relevance to each other. A zero score indicates no/little relevance, and a score of "1" indicates full relevance. As depicted in FIG. 7, the output 704 of the transformer 214 indicates which CRM notes' sentence meet a user-defined question corresponding to one of an enumerated list of scenarios. The scenarios may, in some embodiments, coincide with the RMS scenarios from subsystem 210, as depicted in FIG. 2.

FIG. 8 illustrates a flowchart 800 of steps performed, in some examples, by a system 200 used by an expert user (e.g., a supervisory user, a customer service advisor, or other user/subsystem) to track generated user (e.g., customer) alerts and close out those alerts that are identified as likely being false positives. The method 800 may be for enhanced triaging of alerts which are generated for customer service advisors by using self-supervised machine learning and dimensionality reduction before performing multi-label classification of textual notes, which are about interactions between the customer service advisors and customers, to reduce false positive alerts that the system 200 generates. The identification of false positives may be based, in some examples, on prior alerts and/or labels of prior alerts. The label of a prior alert may be a single, immutable label preassigned by a system of record (or other system from which the alert originated) to attempt to categorize the alert as belonging to a specific, predefined condition set.

In one example, a computer system of record (SOR) detecting that a customer has experienced a substantial loss of income may generate an alert for a customer service advisor to contact/call the customer to offer assistance or guidance. The generated alert is displayed 802 on the graphical user interface (GUI) of the advisor's device screen so that the advisor can review and process the alert. The generated alert may be preassigned a label selected from a predefined enumerated list of labels. In this example the originating system (e.g., the system of record) may select the alert type corresponding to this condition to be a "loss" category type.

Then during the call with the customer, the customer service advisor adds textual notes (e.g., RMS notes) that in addition to loss, other topics of interest such as charges for account maintenance were also mentioned. As a result, at a subsequent time (e.g., a month later), when the system 200 generates an alert for the customer about account maintenance charges, the advisor may intercept the alert and clear it without calling the customer because the RMS notes include textual comments that the particular alert topic have already been discussed. In other words, the alert is a false positive.

Furthermore, the originating system (e.g., SOR) may be isolated and/or disconnected from the history of interactions with the customer. In some prior art systems, a generated alert might result in a poor customer service experience if, unbeknownst to the advisor, the customer previously stated or implied that they did not wish to be bothered about the topic of income loss. In some instances, the advisor might catch that the alert is a false positive because the customer has previously indicated that either the loss risk is unsubstantiated or in error, or that the customer does not wish to engage in discussions about the loss. While a customer service advisor might review the entire history of interactions with the customer before contacting the customer, this manual review consumes time and effort that results in loss of productive and efficiency.

In the system 206 performing the method 800 steps, the advisor's GUI is augmented 804 with enhanced information, including but not limited to a visual indicator, indicating that the loss-type alert has a low/medium/high/other likelihood of being a false positive. The enhanced information may include, in some examples, a preliminary assessment and associated primary rationale that is readable by the customer service advisor. Contemporaneous with servicing the customer, the system 206 may augment this information onto the advisor's GUI to better inform/prepare the advisor for the likelihood that the generated alert is a false positive. The system 206 relies on a machine learning (ML) model in subsystem 208 to determine this likelihood.

Moreover, the ML model that enables subsystem 208 to predict the likelihood of a false positive alert requires specific training and iterative updating 808 to operate effectively. For example, in some embodiments, alerts are more likely to be directly closed if a customer was previously made aware of a particular risk factor. The ML model is therefore tasked to infer the likelihood that the customer was previously notified of a given risk type. However, the materially relevant information pertaining to prior client-advisor communications may be stored in unstructured, plain-text notes. Therefore, natural language processing (NLP) on the notes is desirable.

However, notably, the subsystem 208 does not merely resort to a banal supervised labeling approach. A manually intensive approach in which a squadron of expert/supervisory users spent countless hours to label each textual note stored in the RMS notes data store 202 would be untenable. Moreover, a single-label approach would also be inadequate. For example, some of the most common approaches to text classification include supervised machine learning such as Naïve Bayes algorithm or Support Vector Machines (SVM). Moreover, word and phrase similarity measures and regular expressions are other less sophisticated text analysis tools. These off-the-shelf algorithms are inadequate, by themselves, for the disclosed system 200 for various reasons. For starters, supervised learning algorithms typically require training data to have a trustworthy label, but given an untrustworthy (or no) label, such approaches are inadequate. Instead, the disclosed system relies on one or more unsupervised learning approaches. For label-less approaches, neither is optimized for multi-label classification, and would fail to achieve the ability to identify the likelihood of secondary or even tertiary scenario types. Rather, the system 206 improves upon text classification approaches by ensuring that the training of the ML model does not rely on potentially errant labels (e.g., training a ML model without labels) and the ML model's output is flexible to assign multiple classes to a given textual note. In fact, using the multi-classification relevance score disclosed herein, the disclosed ML model is flexible enough to measure each note against every scenario in an enumerated list of scenarios. In other words, the ML model and subsystems 208, 210 are designed to accommodate multiple classes in a textual note.

Referring to FIG. 8, in step 806, the system 206 receives, through the GUI on the device screen, feedback provided by the customer service advisor about accuracy of the likelihood that the alert is false positive. For example, if an advisor become aware that the customer is about to receive the same alert/risk type as the customer received in the past, then the advisor may provide the system 206 with feedback that there is a high probability that the customer will respond in the same way again. Therefore, the alert has a high likelihood of being a false positive. The advisor might not contact the customer and instead submit feedback to the ML model to iteratively update in step 808, the training of the ML model, as illustrated in FIG. 5, accordingly.

In response to determining 810 that the alert is a false positive because, for example, the first score meets a threshold value, then the system 206 sets the visual indicator in step 812 to show on the GUI to the expert/supervisory user that the likelihood is high that the alert corresponding to the customer is false positive. The ML model combines numerical, categorical, and/or text-based data to quantify the likelihood that the alert would be closed by manual review. The ML engine 208 then uses this final score to display color-coded risk assessment indicators to users (e.g., supervision principals), with the bottom percentile of ML model scores coded in one color (e.g., green), and the top model scoring alerts in a different color (e.g., red).

In step 814, the subsequent action taken by the ML model is to deploy the trained-and-ready ML model for automated disposition of alerts. In the other steps (i.e., during the training phase) in FIG. 8, the ML model is iteratively updated 808 and receiving input from an expert user 806 through an alert dispositioning interface (e.g., a GUI). This input/feedback is used to label the model predictions, thus iteratively improving the efficacy of the system 200. During the training phase, alerts that are cleared by the customer service advisor as false positives, but that the ML model missed, are used to re-train the ML model, in some examples. This re-training may be performed through a feedback loop in which the ML model is iteratively updated. Once the ML model performance achieves a threshold confidence value (i.e., accuracy of 90% or more, or other percentage of confidence), one or more of the steps performed in FIG. 8 may be altered/removed to enable full/nearly-full automatic disposition of alerts that are identified as false positives. Therefore, the advisor may enjoy higher efficiency and productivity through augmented operation with the GUI delivering the advisor with alerts for customers. In addition to automatic closure of alerts, the trained ML model may provide for automatic direct-escalation of alerts.

Figure 9:
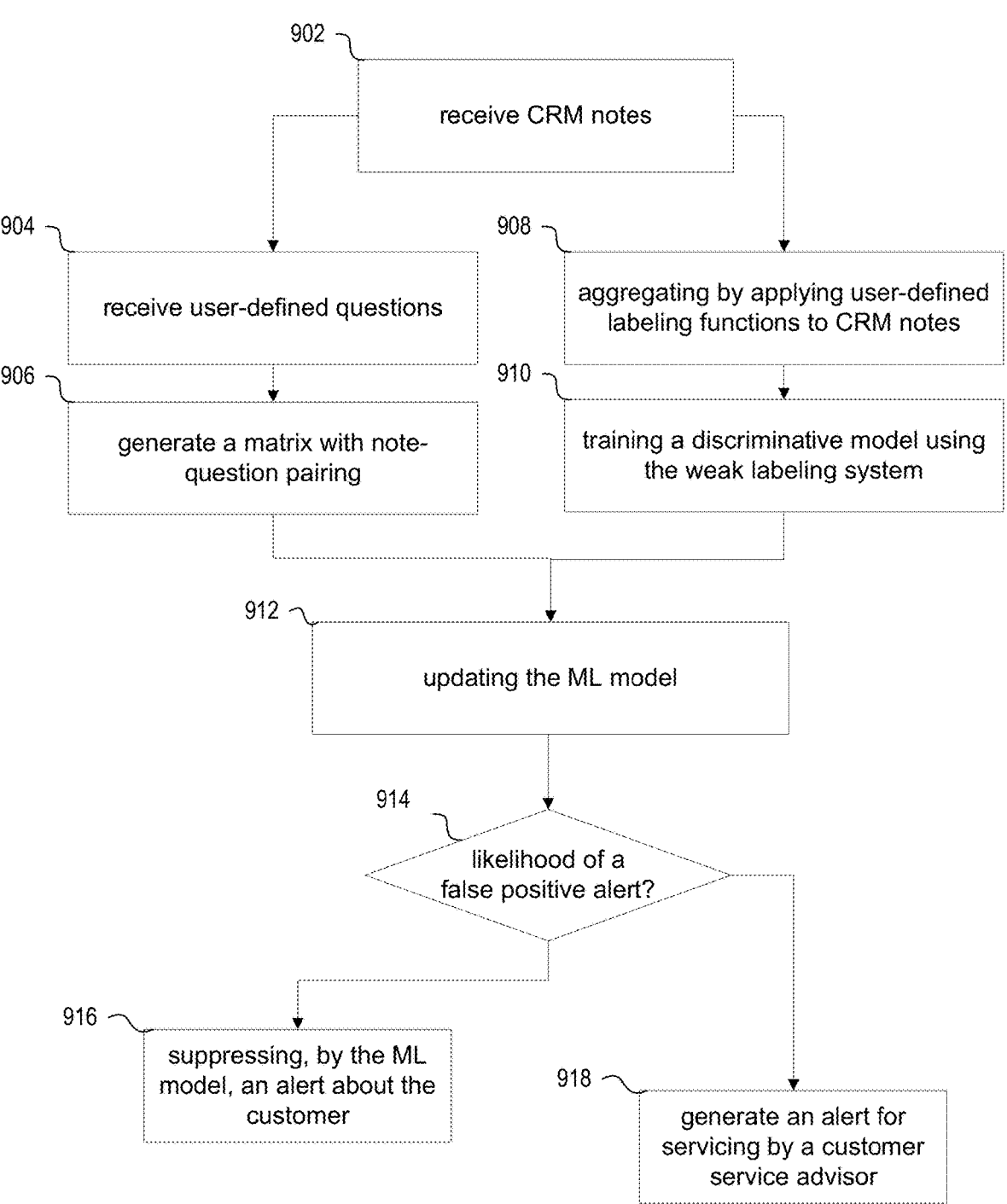
FIG. 9 shows an illustrative flowchart of steps performed by a system that combines advanced AI and machine learning (ML) techniques to predict likelihood of a false positive alert in accordance one or more illustrative aspects described herein.

FIG. 9 shows an illustrative flowchart 900 of steps performed by a system that combines advanced artificial intelligence (AI) and machine learning (ML) techniques to predict likelihood of a false positive alert in accordance one or more illustrative aspects described herein. For example, the flowchart 900 illustrated some steps performed by a system 200, which is sometimes used by an expert user (e.g., a supervisory user, a customer service advisor, or other user/subsystem), to triage generated user (e.g., customer) alerts and expeditiously close those alerts that are identified as likely being false positives. In addition to training one or more ML models of the system 200 with RMS notes such as textual notes stored in a data store 202, the ML model may also be trained on notes or information from other sources, such as data store 204. The information in data store 204 may be customer relationship management (CRM) platform notes that contain a wealth of information relating to advisor-client interactions and communications. The system 200 receives 902 the CRM notes for processing and analysis.

Like RMS notes, CMS notes may be loosely structured plain-text without a reliable label. Unlike RMS in which a note is at least known to be associated with some risk scenario, CRM notes might not be guaranteed to contain relevant information about any alert or client contact. Furthermore, the volume of CRM notes may be far greater than RMS notes in a given timeframe (and there is a non-negligible intersection between the two systems, where textual notes from one are copied into the other). RMS notes is one input channel of textual data, but the context/precursor for an advisor's call has some underlying risk to investigate, i.e., the scenario of interest among the plurality of enumerated scenarios. The customer relationship management (CRM) platform notes (and/or input channel/stream) is different from RMS notes namely because the impetus for the CRM platform notes might be completely or partially unrelated to risk. Therefore, machine learning techniques that are disclosed for training based on a corpus of RMS notes might not be directly translated to CRM and other notes.

A combination of sophisticated natural language processing (NLP) techniques is useful to extract relevant text from noise present in the large volume of CRM notes. The relevant text may be relevant risk scenario data from CRM notes. Then, the CRM note can be related back to one of the risk-scenario types among an enumerated list of scenarios, similar to those described in relation to risk management supervision (RMS) notes. The CRM note may then be treated as evidence that a customer has been previously made aware of a specific risk scenario, thus an alert generated for a customer service advisor for that specific scenario can then be suppressed as a false positive alert. Without these two conditions have been met, a CRM note might not provide meaningful input to the overall system 200 including the alert triaging robot.

Referring to FIG. 9, a novel aspect of some embodiments disclosed herein includes generating an overall relevance score of text by combining a machine learning (ML) clustering method 206 with at least sentence-transformers 214 and/or weak labeling 212 methods disclosed herein. In some examples, the system 200 may omit the sentence-transformers 214 to improve efficiency and/or responsiveness of the system. With AI sentence transformers 214, the model may be trained on a search engine dataset, which contains a large number of document-question pairs 702 and a numerical relevance score for each (e.g., 1 for relevant pairs, down to 0 for otherwise), as illustrated in FIG. 7. The input data (embeddings) may be structured into the pairing. Each CRM note is processed to generate 906 a matrix 702, where each row represents a received 904 user-defined question, each column represents a sentence from the note, and the table entry captures their relevance to each other. The output of the matrix 702 provides both the most relevant sentence from the document for each question as well as a numerical score between 0 and 1 that quantifies how relevant. Already knowing which risk scenario is being targeted by each question, what is left is simply a set of risk areas and associated scores. In some examples, the risk scenarios may coincide with the RMS scenarios from subsystem 210, as depicted in FIG. 2. Empirically, if the relevance scores inferred by the AI sentence transformer are low (<0.05), then the system 200 reinforces the irrelevance of the CRM notes to the overall performance of the system 200. Thus the output of the AI sentence transformer 214 may only slightly or not at all contribute to the updating 912 of the machine learning (ML) model underlying the system 200.

Referring to FIG. 9, weak labeling 212 provides an algorithmic alternative to manual labeling. A variety of supervised learning techniques are contemplated for use with the weak labeling 212 subsystem. As an input, the weak labeler receives raw text of CRM notes and user-defined labeling functions. Labeling functions serve a similar purpose to the questions fed into the sentence-transformer 214, but afford a higher degree of control at the cost of increased manual coding work. Examples of labeling functions can be as simple as length of notes, presence of key-phrases, and grow in complexity from there.

Once all labeling functions have been applied to the CMS note, the resulting values can be aggregated 908 to create a holistic weak label for the CMS note. For example, aggregating 908 the results by applying user-defined labeling functions to the CRM notes provide a holistic weak label for each CRM note. Aggregation techniques include, but are not limited to, a "majority vote" of the labeling functions, un-weighted or weighted averages, and the like. In some embodiments, the pipeline running from labeling functions to aggregate weak labels includes the ability to learn the accuracies of the labeling functions and the correlations between the functions; this technique provides a means of achieving better probabilistic training labels than could be achieved by simple averaging alone. Heuristic labels can then be used to train a discriminative model, one whose purpose is, among other things, to separate classes of points. The subsystem 212 trains 910 a discriminative model using heuristics labels generated by the weak labeling system after the aggregating step. When applied to a secondary small set of manually labeled testing data, the advantages and strength of the heuristic labels is clear—this strategy unlocks the suite of supervised learning techniques that would be apparent a person of skill in the art after review of the entirety disclosed herein.

Referring to step 912, the outputs of one or more discriminative models cause updating 912 of a machine learning (ML) model that was trained by at least system 206. System 206 trains the ML model based on one or more clustering techniques (including k-means) to output 914 a likelihood that a forthcoming alert corresponding to the customer is false positive. If the alert is a false positive, the alert is suppressed 916 such that a customer service advisor (whether the advisor be a person or an AI-powered bot) does not expend effort to address the alert. But if the likelihood if low/non-existent that the forthcoming alert is a false positive, then an alert may be generated 918 to guide a customer service advisor to service the customer for the particular risk scenario associated with the alert.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

We claim:

1. A method for automated triaging of alerts generated for customer service advisors to reduce false positive alerts using artificial intelligence (AI) sentence transformers, weak labeling in machine learning, and multi-label classification of textual notes about interactions between the customer service advisors and customers, the method comprising:

receiving as input, from a customer relationship management (CRM) platform, CRM notes that comprise text related to a customer;

receiving a plurality of user-defined questions relating to each of an enumerated list of scenarios;

generating, using an AI sentence transformer, a matrix with CRM note-question pairs that captures relevance of each CRM note to a first scenario in the enumerated list of scenarios, wherein the pairs are structured as input embeddings;

aggregating, using a weak labeling system, results by applying user-defined labeling functions to the CRM notes, wherein the aggregated results provide a holistic weak label for each CRM note;

training a discriminative model using heuristics labels generated by the weak labeling system after the aggregating step;

updating, based on an output of the AI sentence transformer and the discriminative model, a machine learning (ML) model, which was trained based on k-means clustering outputs from a text-frequency matrix created from RMS notes, wherein the ML model was created by steps comprising:

filtering keywords in RMS notes to remove a first set of keywords that fail to correspond to any specific scenario among the enumerated list of scenarios; and after the filtering of the keywords, transforming the RMS notes into a text-frequency matrix, wherein the first set of keywords are omitted from the text-frequency matrix, and wherein each row of the text-frequency matrix represents a different RMS note; and suppressing, by the ML model, an alert about the customer based on a likelihood that the alert corresponding to the customer is false positive, wherein the alert is for a customer with a likelihood of satisfying the first scenario from among the enumerated list of scenarios, wherein unsuppressed alerts are displayed on a graphical user interface (GUI) to a customer service advisor responsible for servicing the customer.

2. The method of claim 1, wherein the ML model:

infers a likelihood that the customer was previously notified of the first scenario by clustering numerical representations of the RMS notes, which represent interactions between the customer service advisor and the customer, in relation to the enumerated list of scenarios; and outputs a multi-classification relevance score associated with the customer, wherein the multi-classification relevance score comprises a relevance score corresponding to the first scenario, and wherein each relevance score in the multi-classification relevance score is calculated as a distance from a corresponding numerical representation to a centroid of a corresponding cluster.

3. The method of claim 1, wherein the ML model was created by further steps comprising:

reducing a dimension of the text-frequency matrix, wherein the text-frequency matrix is outputted as numerical representations;

k-means clustering on the numerical representations outputted by the text-frequency matrix to produce a plurality of clusters, each cluster corresponding to a single scenario in the enumerated list of scenarios; and for each RMS note, outputting a multi-classification relevance score that includes a quantity of scores matching a quantity of clusters in the plurality of clusters, wherein each score in the multi-classification relevance score is calculated as a distance from the corresponding numerical representation to a centroid of a corresponding cluster, wherein the multi-classification relevance score corresponds to a likelihood that a particular RMS note belongs to a specific scenario.

4. The method of claim 1, further comprising: tagging a CRM note as corresponding to the first scenario of the enumerated list of scenarios based on the output of the AI sentence transformer.

5. The method of claim 1, wherein the user-defined labeling functions comprise labeling based on length of a note and presence of particular keywords.

6. The method of claim 1, wherein the aggregating is performed by calculating an unweighted average.

7. The method of claim 1, further comprising: outputting an accuracy of a labeling function of the user-defined labeling functions.

8. The method of claim 1, wherein the customer service advisor includes an AI-chat bot.

9. The method of claim 1, wherein the plurality of user-defined questions used with the AI sentence transformer correspond to features for feature engineering of the ML model that predicts the likelihood that the alert corresponding to the customer is false positive.

10. The method of claim 1, wherein the aggregating of the results includes a majority vote of the user-defined labeling functions.

11. The method of claim 1, wherein the likelihood that the alert corresponding to the customer is false positive further comprises: the ML model taking as inputs prior occurrences of alerts, total assets of the customer, recent losses of the customer, types of securities traded by the customer, and birthdate of the customer.

12. A non-transitory computer-readable medium storing computer-executable instruction, which when executed by a computer processor, cause the computer processor to perform steps comprising:

receiving as input, from a customer relationship management (CRM) platform, CRM notes that comprise text related to a customer;

receiving a plurality of user-defined questions relating to each of an enumerated list of scenarios;

generating, using an AI sentence transformer, a matrix with CRM note-question pairs that captures relevance of each CRM note to a first scenario in the enumerated list of scenarios, wherein the pairs are structured as input embeddings;

aggregating, using a weak labeling system, results by applying user-defined labeling functions to the CRM notes, wherein the aggregated results provide a holistic weak label for each CRM note;

training a discriminative model using heuristics labels generated by the weak labeling system after the aggregating step;

updating, based on an output of the AI sentence transformer and the discriminative model, a machine learning (ML) model, which was trained based on k-means soft clustering outputs from a text-frequency matrix created from RMS notes, wherein the ML model was created by steps comprising:

filtering keywords in RMS notes to remove a first set of keywords that fail to correspond to any specific scenario among the enumerated list of scenarios; and after the filtering of the keywords, transforming the RMS notes into a text-frequency matrix, wherein the first set of keywords are omitted from the text-frequency matrix, and wherein each row of the text-frequency matrix represents a different RMS note; and suppressing, by the ML model, an alert about the customer based on a likelihood that the alert corresponding to the customer is false positive, wherein the alert is for a customer with a likelihood of satisfying the first scenario from among the enumerated list of scenarios, wherein unsuppressed alerts are displayed on a graphical user interface (GUI) to a customer service advisor responsible for servicing the customer.

13. The non-transitory computer-readable medium of claim 12, wherein the ML model:

infers a likelihood that the customer was previously notified of the first scenario by clustering numerical representations of the RMS notes, which represent interactions between the customer service advisor and the customer, in relation to the enumerated list of scenarios; and outputs a multi-classification relevance score associated with the customer, wherein the multi-classification relevance score comprises a relevance score corresponding to the first scenario, and wherein each relevance score in the multi-classification relevance score is calculated as a distance from a corresponding numerical representation to a centroid of a corresponding cluster.

14. The non-transitory computer-readable medium of claim 12, further comprising: tagging a CRM note as corresponding to the first scenario of the enumerated list of scenarios based on the output of the AI sentence transformer, and wherein the plurality of user-defined questions used with the AI sentence transformer correspond to features for feature engineering of the ML model that predicts the likelihood that the alert corresponding to the customer is false positive.

15. The non-transitory computer-readable medium of claim 12, wherein the user-defined labeling functions comprise labeling based on length of a note and presence of particular keywords, and the computer-executable instructions, which when executed by the computer processor, cause the computer processor to perform steps comprising: outputting an accuracy of a labeling function of the user-defined labeling functions.

16. The non-transitory computer-readable medium of claim 12, wherein the aggregating of the results includes a majority vote of the user-defined labeling functions.

17. A method for automated triaging of alerts generated for customer service advisors to reduce false positive alerts, the method comprising:

receiving as input, from a customer relationship management (CRM) platform, CRM notes that comprise text related to a customer;

aggregating, using a weak labeling system, results by applying user-defined labeling functions to the CRM notes, wherein the aggregated results provide a holistic weak label for each CRM note;

training a discriminative model using heuristics labels generated by the weak labeling system after the aggregating step;

updating, based on an output of the discriminative model and an output of an AI sentence transformer, a machine learning (ML) model, which was trained based on k-means clustering outputs from a text-frequency matrix created from RMS notes, receiving a plurality of user-defined questions relating to each enumerated scenario of an enumerated list of scenarios; and generating, using the AI sentence transformer, a matrix with CRM note-question pairs that captures relevance of each CRM note to a first scenario in the enumerated list of scenarios; and suppressing, by the ML model, an alert about the customer based on a likelihood that the alert corresponding to the customer is false positive, wherein the alert is for a customer with a likelihood of satisfying the first scenario from among the enumerated list of scenarios, wherein unsuppressed alerts are displayed on a graphical user interface (GUI) to a customer service advisor responsible for servicing the customer.

18. The method of claim 17, wherein the ML model:

infers a likelihood that the customer was previously notified of the first scenario by clustering numerical representations of the RMS notes, which represent interactions between the customer service advisor and the customer, in relation to the enumerated list of scenarios; and outputs a multi-classification relevance score associated with the customer, wherein the multi-classification relevance score comprises a relevance score corresponding to the first scenario, and wherein each relevance score in the multi-classification relevance score is calculated as a distance from a corresponding numerical representation to a centroid of a corresponding cluster, and the ML model was created by steps comprising:

filtering keywords in RMS notes to remove a first set of keywords that fail to correspond to any specific scenario among the enumerated list of scenarios;

after the filtering of the keywords, transforming the RMS notes into a text-frequency matrix, wherein the first set of keywords are omitted from the text-frequency matrix, and wherein each row of the text-frequency matrix represents a different RMS note;

reducing a dimension of the text-frequency matrix, wherein the text-frequency matrix is outputted as numerical representations;

k-means clustering on the numerical representations outputted by the text-frequency matrix to produce a plurality of clusters, each cluster corresponding to a single scenario in the enumerated list of scenarios; and for each RMS note, outputting a multi-classification relevance score that includes a quantity of scores matching a quantity of clusters in the plurality of clusters, wherein each score in the multi-classification relevance score is calculated as a distance from the corresponding numerical representation to a centroid of a corresponding cluster, wherein the multi-classification relevance score corresponds to a likelihood that a particular RMS note belongs to a specific scenario.

* * * * *